Nov. 11, 1969  G. K. NUTZ  3,478,219
OPTICAL PRISM WITH MULTIPLE PHOTOCELLS
Filed Jan. 17, 1968  4 Sheets-Sheet 1

INVENTOR.
GEORGE K. NUTZ
BY
ATTORNEY

INVENTOR.
GEORGE K. NUTZ
BY Herbert L. Davis
ATTORNEY

Nov. 11, 1969  G. K. NUTZ  3,478,219
OPTICAL PRISM WITH MULTIPLE PHOTOCELLS
Filed Jan. 17, 1968  4 Sheets-Sheet 4

INVENTOR.
GEORGE K. NUTZ
BY Hubert L. Davis
ATTORNEY

United States Patent Office 3,478,219
Patented Nov. 11, 1969

3,478,219
OPTICAL PRISM WITH MULTIPLE PHOTOCELLS
George Kaspar Nutz, Hasbrouck Heights, N.J., assignor to The Bendix Corporation, a corporation of Delaware
Filed Jan. 17, 1968, Ser. No. 698,527
Int. Cl. H01j *39/12*
U.S. Cl. 250—220                                              11 Claims

ABSTRACT OF THE DISCLOSURE

A two-axis solid state optical pyramid prism sun sensor of high resolution including photovoltaic cells positioned adjacent the respective four side surfaces of the pyramid prism so as to provide a light sensing cell quadrant network of increased sensitivity to effect two-axis electrical signal information of a high accuracy and to eliminate errors created by sun sensors of the prior art type utilizing two separate one-axis systems.

The two-axis systems of the solid state pyramid prism sun sensor of the present invention are both dependent upon the same optical prism in which the base angles of the prism are greater than the critical angle so that the light is internally reflected from the first side surface to the opposite side surface at the critical angle so that in such two-axis systems greater freedom in the size and location of the photovoltaic cells may be provided with somewhat less criticality while providing greater protection from the effects of stray light.

In a modified form of the solid state pyramid prism sun sensor, there may be additionally mounted on a flat rear surface face of a frustum of the pyramidal prism a light detector or quad light sensitive cell arrangement in combination with a suitable masking on the flat front surface face of the prism so as to effect a wide range of coarse angle electrical signal information, as well as the fine angle sensing electrical signal information effected by the voltaic cells placed adjacent the four side surfaces of the prism.

BACKGROUND OF THE INVENTION

Field of the invention

This invention relates to a two-axis sun sensing device, and more particularly, to a sun sensing device embodying a prism including sun sensing cells placed adjacent surfaces of the prism so as to provide two-axis electrical signal information particularly adapted to establish a reference for the attitude control of a space vehicle.

Description of the prior art

Heretofore, complex sun sensing devices have been provided to effect a two-axis sun sensing action for controlling orientation of a space vehicle relative to the sun as disclosed and claimed in a U.S. Patent No. 3,268,185 granted Aug. 23, 1966 to Alfred E. Eckermann, Jr.; U.S. Patent No. 3,297,395 granted Jan. 10, 1967 to Sahag Dardarian; U.S. Patent No. 3,308,298 granted Mar. 7, 1967 to Frederick Rawls, Michael T. Krivak and Sahag Dardarian and U.S. Patent No. 3,308,299 granted Mar. 7, 1967 to Sahag Dardarian, all of which patents have been assigned to The Bendix Corporation assignee of the present invention.

None of these patents, however, suggest the simplified pyramid prism sun sensor structure of the present invention for effecting the highly accurate two-axis sun sensing action of the present invention.

Moreover, while a one-axis critical angle isosceles prism sun sensor is disclosed and claimed in a U.S. Patent No. 3,137,794 granted June 16, 1964 to Harold H. Seward, it has been found that in the utilization of two of the separate one-axis systems of the type disclosed in the Seward patent to provide two-axis sun sensing action, the two-axis electrical signal tracking information so effected would be subject to errors which are eliminated by the provision of the solid state pyramid prism sun sensor of the present invention.

Moreover, in the utilization of the pair of separate one-axis systems, each of the one-axis critical angle isosceles prism sun sensors of the type of the Seward patent operates on the basis of Snell's law in that the sensed light rays in the denser medium of the isosceles prism goes from refraction to internal reflection upon the angle of the sensed light rays exceeding a critical angle of the denser medium while in the operation of the pyramid prism of the present invention the two sensing axis systems are both dependent upon a single optical prism of a form corresponding to a frustum of a pyramid in which the base angles of the pyramid prism are not at the critical angle of the prism materials so that the pyramid prism of the present invention is not a critical angle prism such as disclosed in the Seward patent.

Moreover, it has been found that the size and locations of the photovoltaic light sensing cells for the two-axis sun sensor device of the present invention are of less criticality than that of the photovoltaic cells of the device of the Seward patent so as to provide greater freedom in size and location of the photo cells and more protection from the effects of stray light than in the critical angle isosceles prism type sun sensor of the prior art Seward patent.

Furthermore, in a copending U.S. Application Ser. No. 549,956, assigned to The Bendix Corporation, and filed May 13, 1966 by Alfred E. Eckermann, Jr., for an Internal Reflection Temperature Controlled Sun Sensor, there is provided a sun sensor including an internally reflecting conical lens having an apex angle for providing a broad null output and further providing in the arrangement of the conical lens, means for internally reflecting substantially all the rays of the sun that may enter the angular cone so as to effect a total internal reflection for protecting the sensor and the sensor light detecting cells against the direct rays of the sun, but in which arrangement there is no suggestion of the extremely simple pyramid prism including the four photovoltaic cells in the arrangement of the present invention for effecting the highly accurate sun sensing tracking operation through two-axes sensing systems, both dependent upon the single optical pyramid prism of the present invention.

The present invention resides in a concept which simplifies complex mechanisms and reduces the number of necessary parts, while at the same time raising the percent of durability and certainty of operation so as to effect a condition of greater durability and one which is more sure to produce practically the same result and not only with greater certainty, but with less expense than the prior art devices.

SUMMARY OF THE INVENTION

An object of the present invention is to provide a simplified two-axis solid state pyramid prism sun sensor of high resolution to eliminate tracking errors such as have been found to develop in the use of two separate one-axis tracking systems of the type disclosed in the Seward U.S. Patent No. 3,137,794, granted June 16, 1964.

Another object of the invention is to provide two-axis sun sensing systems, both of which systems are dependent upon a single optical prism of a pyramid type having base angles of the pyramid prism not arranged at the critical angle of the prism material so that light sensing photo cells may be located in the two-axis sun sensor device of the present invention with less criticality than the photo cells of the sun sensor device of the Seward patent and in an arrangement which affords greater protection from the effects of stray light rays than that afforded by the "critical angle" single axis isosceles prism of the Seward patent.

Another object of the invention is to provide a sun sensor including a pyramid prism having fine angle light sensing voltaic cells cemented into the housing of the sun sensor in a predetermined angular relation to adjacent side surfaces of the pyramid prism.

Another object of the invention is to provide such a pyramid prism including the fine angle light sensing cells for effecting the fine angle sensing range of information, together with a coarse cell sensing means cemented on a rear face of the prism, and including masking means on a flat front surface of the prism face so as to effect a wide range of coarse angle information, as well as the fine angle sensing range of information.

Another object of the invention is to provide a compact sun sensor device including a solid state two-axis pyramid prism with fine angle sensing voltaic cells positioned in the housing of the device adjacent side surfaces of the pyramid prism.

Another objection of the invention is to provide in such a compact sun sensor device a pyramid prism having non-critical base angles so arranged as to fold the light path so as to permit an optimum range of location of the light sensing cells, as well as cell size.

Another object of the invention is to provide a single solid state pyramid prism sun sensor so arranged in relation to light sensing photo cells as to eliminate two-axis tracking errors heretofore caused by thermal distortion in prior sun sensor devices.

Another object of the invention is to provide a simplified solid state pyramid prism sun sensor including both a fine and coarse sensing system in operative relation to a single pyramid prism.

Another object of the invention is to provide a solid state pyramid prism sun sensor having arc second nulling capability in two axes for the fine system and arc minutes nulling capability in the two axes of the coarse angle sensing system.

These and other objects and features of the invention are pointed out in the following description in terms of the embodiments thereof which are shown in the accompanying drawings. It is to be understood, however, that the drawings are for the purpose of illustration only and not a definition of the limits of the invention, reference being had to the appended claims for this purpose.

DESCRIPTION OF THE DRAWINGS

In the drawings, in which corresponding numerals indicate corresponding parts.

DESCRIPTION OF THE EMBODIMENTS OF THE INVENTION

Figure 1:
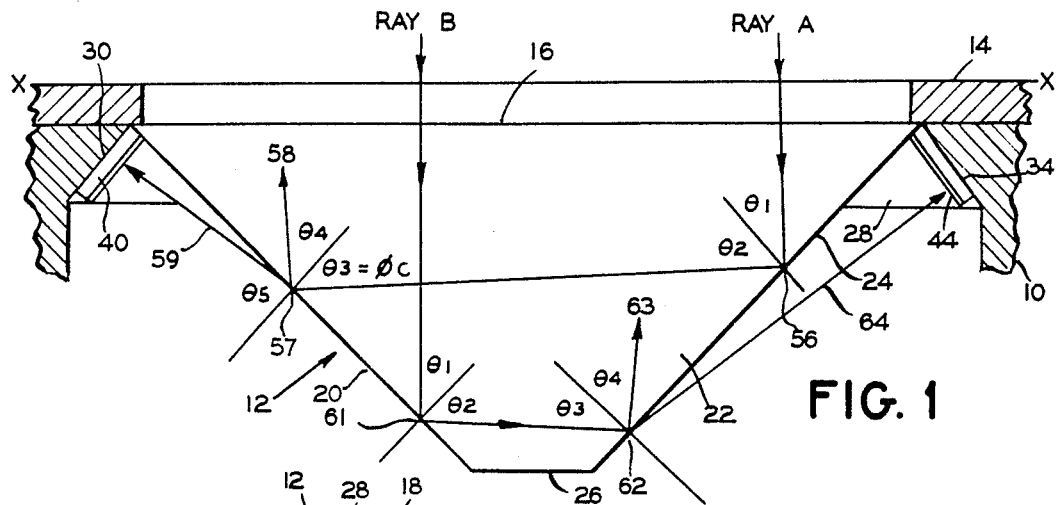
FIGURE 1 is an enlarged fragmentary sectional view illustrating the operative relation of the pyramid prism of the present invention to the fine angle sensing photovoltaic cells shown cemented in the housing of the device in a predetermined angular relation adjacent to the respective side surfaces of the prism.
Figure 2:
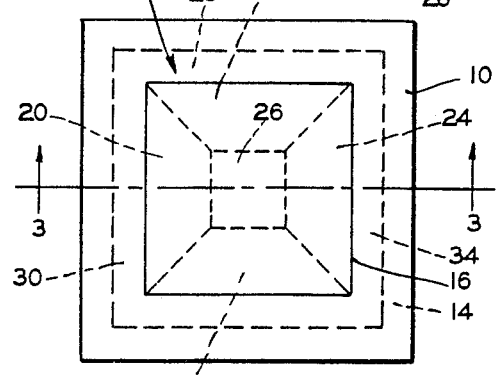
FIGURE 2 is a front view of a sun sensor device including a housing and pyramid prism embodying the present invention.
Figure 3:
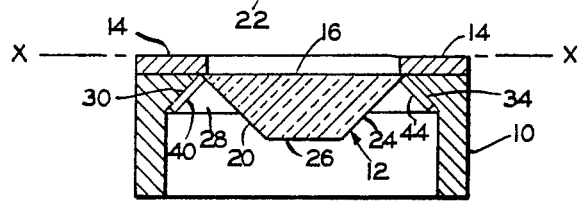
FIGURE 3 is a sectional view of FIGURE 2 taken along the lines 3—3 and looking in the direction of the arrows.
Figure 4:
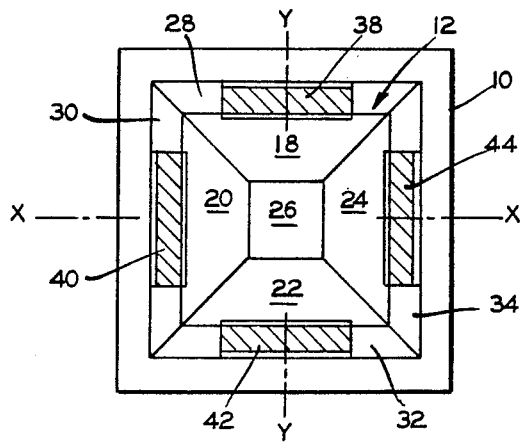
FIGURE 4 is a rear view of the sun sensor device of FIGURE 2 and showing a rear face of the prism and the fine sensing voltaic cells positioned in the housing in a predetermined angular relation adjacent the respective side surfaces of the prism.

Referring to FIGURE 1, there is indicated generally by the numeral 10 a frame which serves as a housing for a prism 12 in the form of a frustum of a pyramid. The prism 12 is made of suitable optical material such as glass and the base angles of the prism are greater than the critical angle value of the media of the prism at which light rays entering the media at an angle in excess of such a critical angle are internally reflected from the first side surface to the opposite side surface at the critical angle.

The pyramidal prism 12 is secured in the housing 10 to a retaining plate 14 which is in turn suitably cemented or secured to the front end of the housing 10.

The prism 12 is in the form of a frustum of a pyramid having as a base of the pyramid a flat front surface 16, four side surfaces 18, 20, 22 and 24 extending from the flat front surface 16 at an angle substantially more than said critical angle value of the media of the prism to a rear flat surface 26 of the frustum of the pyramidal prism 12.

The housing 10 includes inwardly projecting angular interior flange portions 28, 30, 32 and 34 to which there has been suitably secured or cemented light sensitive elements, such as photovoltaic cells 38, 40, 42 and 44 mounted interiorly of the housing 10 on the inner surfaces of the angular flange portions 28, 30, 32 and 34 with the light receiving surfaces thereof positioned in a predetermined angular relation to the plane of the side surfaces 18, 20, 22 and 24, respectively, of the pyramidal prism 12.

The four photovoltaic cells 38, 40, 42 and 44 provide fine angle light sensing cells which are interiorly mounted within the housing 10 adjacent the prism side surfaces 18, 20, 22 and 24.

The housing 10 of the sun sensor device is suitably mounted then at a predetermined point on a space vehicle for sensory operation and to a fine resolution gimballing system for a sun tracking operation.

The sun sensing device, as shown in FIGURES 1, 2, 3 and 4, is an extremely simple single pyramidal prism photo sensing cell device. It should be borne in mind, however, that light rays impinging upon a glass-to-air surface will be totally reflected when the angle of the light rays to the normal of the surface of the prism is greater than a critical angle $\phi_c$ of the glass, while the light rays will be partially reflected and refracted when the angle of the light rays impinging upon the glass-to-air surface is minutely smaller than this critical angle $\phi_c$, and will approach complete refraction when the angle is substantially less than the critical angle $\phi_c$.

The pyramidal prism 12 is mounted in the housing 10 by retaining plate 14 with the flat front face surface of the prism being normally positioned towards the source of light with the base angles formed by side surfaces 18, 20, 22 and 24 with the flat front face surface 16 being substantially less than the value of the aforesaid critical angle $\phi_c$ of the prism material or glass.

The four photovoltaic cells 38, 40, 42 and 44 are mounted in a predetermined angular relation adjacent to the side surfaces 18, 20, 22 and 24 of the prism 12 so as to provide X and Y axis electrical signal information.

Sun rays A and B are shown at FIGURE 1 entering the prism 12 at essentially normal angles to the prism base surface 16. Both rays A and B enter the prism and impinge upon a prism side at 56 and 61, respectively, at an angle greater than the critical angle, $\phi_c$, so that both rays are completely reflected; $\theta_1 = \theta_2$. Both rays then progress to their opposite prism sides where they impinge at an angle near the critical angle $\phi_c$. Ray A does this at 57 and ray B at 62. At points 57 and 62, the great majority of light is reflected back into the prism as indicated by 58 and 63 while a very small amount of light is refracted as indicated by 59 and 64 to the light sensitive cells 40 and 44, respectively. Any deviation of rays A and B from the normal to the prism face will result in $\theta_3$ at 57 and 62 changing from $\phi_c$, and a corresponding change in the light levels and outputs of cells 40 and 44.

Figure 6:
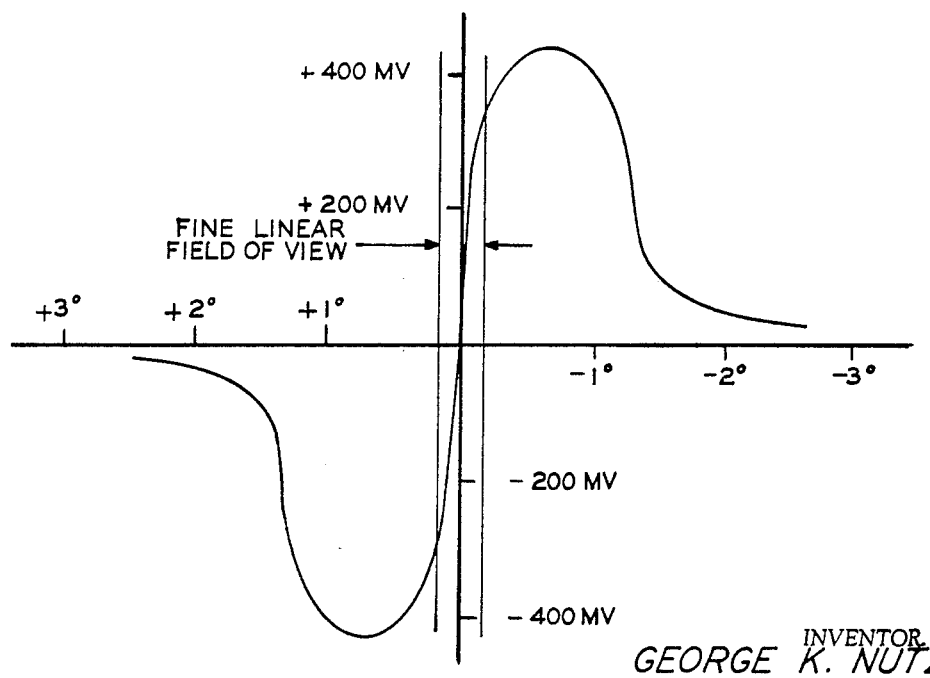
FIGURE 6 is a graphical illustration showing the electrical control signal outputs provided by the light sensing photovoltaic cells mounted along one or the other of the X and Y axes of the electrical system of FIGURE 5.

The amount of light reflected at 61 and 62 for any incoming light angle ($\theta_3$) is $$R = \tfrac{1}{2}\left[\frac{\sin^2(\theta_3 - \theta_5)}{\sin^2(\theta_3 + \theta_5)} + \frac{\tan^2(\theta_3 - \theta_5)}{\tan^2(\theta_3 + \theta_5)}\right]$$

and for the first five arc seconds of movement from the null, the amount of light refracted increases from 0% to 4% of the incoming light giving the device a sensitivity of several millivolts per arc second. The pyramidal prism 12 is designed so that $\theta_3$ at 57 and 62 is minutely less than the critical angle at null and a small amount of light is incident on both cells 40 and 44. Thus as the light increases on one cell, it decreases on the other so that as light rays $\theta_3$ at 62 increases, the light rays $\theta_3$ at 57 decreases and the device sensitivity is in effect doubled. The graph at FIGURE 6 displays the output characteristics of the device.

As the prism 12 is in the form of a frustum of a pyramid, there is provided the flat rear surface face 26 which may be used for mounting a coarse light angle sensing detector for effecting coarse angle signal information, as hereinafter explained with reference to FIGURES 7, 8, 9 and 10.

Figure 5:
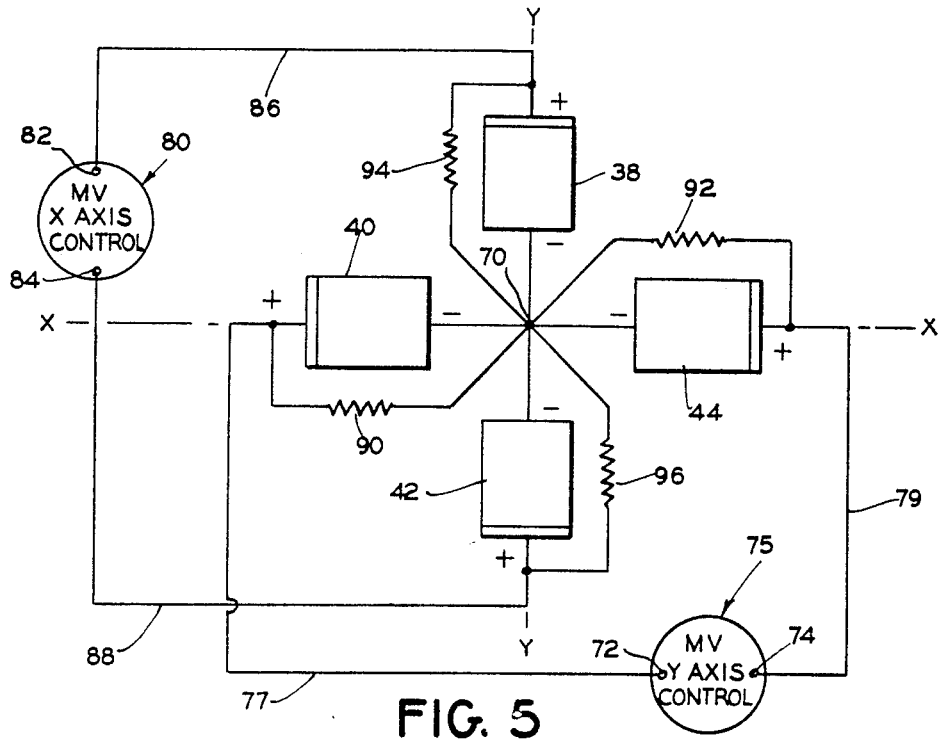
FIGURE 5 is a schematic wiring diagram showing a system for controlling the attitude of a space vehicle about two perpendicular axes X and Y in response to electrical signals effected by fine angle sensing photovoltaic cells in response to sensed light rays passing through a pyramidal prism and internally refracted therein to the photo cells from the sun or other reference light source as shown by FIGURE 1.

Referring now to the schematic wiring diagram of FIGURE 5, it will be seen that the four photovoltaic cells 38, 40, 42 and 44 are electrically connected with their negative terminals to a common point 70.

Electrical signal information of angular deviations in the sensed light rays from a reference null about the Y-axis is received at input terminals 72 and 74 of a suitable Y-axis control mechanism 75 for an outer space vehicle, not shown, to return the sensed light rays to the null condition.

The input terminal 72 is connected through an electrical conductor 77 to a positive output terminal of a photovoltaic cell 40 while the input terminal 74 is connected through an electrical conductor 79 to a positive terminal of the photovoltaic cell 44.

Similarly, signal information of angular deviations in the sensed light rays from a reference null about the X-axis is applied to an X-axis control mechanism 80 of the outer space vehicle and across input terminals 82 and 84 thereof to return the sensed light rays to the null condition.

The input terminal 82 is connected through an electrical conductor 86 to a positive terminal of the photovoltaic cell 38, while the input terminal 84 is connected through an electrical conductor 88 to a positive terminal of the photovoltaic cell 42. At null the cell outputs are equal and opposite and the voltages at the control mechanisms 75 and 80 are zero. Four balance resistors 90, 92, 94 and 96 are connected across the respective voltaic cells. Thus the balance resistors 90 and 92 are connected across the photovoltaic cells 40 and 44, while resistors 94 and 96 are connected across the photovoltaic cells 38 and 42, respectively. The arrangement of the balance resistors 90, 92, 94 and 96 is such as to correct the matched cells 40 and 44, 38 and 42 for output and temperature coefficient differences. The general output characteristics of the photovoltaic cells of the electrical network arrangement of FIGURE 5 are shown graphically in FIGURE 6.

In the modified form of the invention, as shown by FIGURES 7 through 11, corresponding numerals indicate corresponding parts to those heretofore described with reference to FIGURES 1 through 5. In addition on the flat rear surface face 26 of the prism 12, there are secured by cement or other suitable means a quad cell arrangement 100 divided into four square segments or matched light sensing elements 101, 103, 105 and 107 of equal area. Each segment 101, 103, 105 and 107 may comprise a light detecting element such as selenium, silicon or cadmium sulfide, which generates a voltage or current when exposed to light. Opposed segments 101 and 105 and opposed segments 103 and 107 are connected together in opposition to one another with segments 101 and 105 providing electrical signals for controlling the attitude of the outer space vehicle about an axis X and segments 103 and 107 providing electrical signals for controlling the attitude of the outer space vehicle about an axis Y at right angles to the X-axis.

Figure 11:
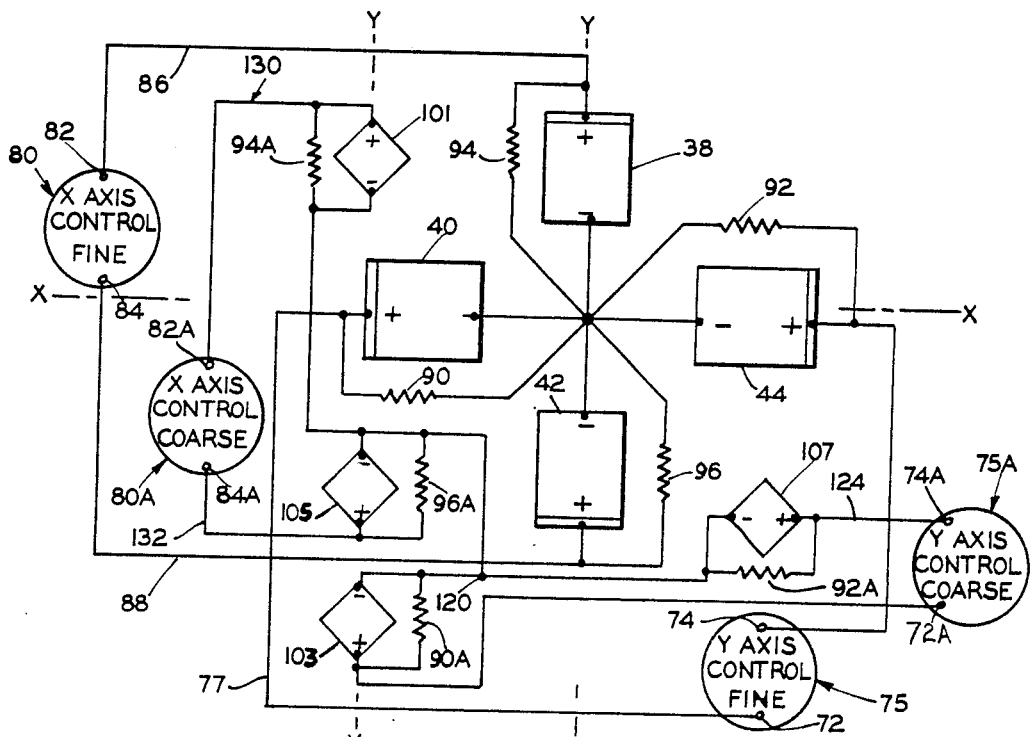
FIGURE 11 is a schematic wiring diagram showing the fine and coarse angle sensing voltaic cells operatively connected for controlling the attitude of the space vehicle about the two perpendicular axes.

Four balance resistors 90A, 92A, 94A and 96A are connected across the respective light sensing elements 101, 103, 105 and 107, as shown by the wiring diagram of FIGURE 11, so as to correct the matched light sensing elements for output and temperature coefficient differences.

The quad cell arrangement 100 of the present invention is broadly similar in its mode of operation to the quad cell arrangement disclosed in the aforementioned U.S. Patent No. 3,268,185 granted Aug. 23, 1966, to Alfred E. Eckermann, Jr. Furthermore, a disc 110 is affixed by cement or other suitable fastening means to the flat forward surface 16 of the pyramidal prism 12, as shown in FIGURES 7, 8, 9 and 10. The disc 110 has a concentric circular aperture 112 therein to provide for transmission of light rays from the sun or other light source onto the light sensitive detector or quad cell arrangement 100.

When the light source is coincident with the axis of the light sensing device hereinafter referred to as the Z-axis, light from the source is directed through the aperture 112 and is centered on detector 100 so as to equally illuminate the four segments 101, 103, 105 and 107. Under this condition, equal voltages or currents are generated by the segments and the net output is zero. When the light source is not coincident with the Z-axis, light from the source is directed through aperture 112 so as to illuminate the segments unequally and the more highly illuminated segment or segments generate a higher voltage or current than the opposite segment or segments. The Z-axis, it will be observed, is perpendicular to the plane of the X, Y axes.

As shown by the wiring diagram of FIGURE 11, the four light sensitive segments 101, 103, 105 and 107 are connected with their negative terminals to a common point 120. The positive terminal of the light sensitive segment 103 is connected by an electrical conductor 122 leading to the input terminal 72A of the Y-axis coarse control mechanism 75A, while the positive terminal of the light sensitive segment 107 is connected by electrical conductor 124 leading to the input terminal 74A of the Y-axis coarse control mechanism 75A. Thus the Y-axis signal information is supplied from the light sensitive segments 103 and 107 to the Y-axis coarse control mechanism 75A.

Similarly, the light sensitive segment 101 is connected at a positive terminal through an electrical conductor 130 leading to the input terminal 82A of the X-axis coarse control mechanism 80A, while the opposite light sensitive segment 105 is connected at its positive terminal through an electrical conductor 132 to the input terminal 84A of the X-axis coarse control mechanism 80A. Thus, the X-axis signal information supplied by the light sensitive segments 101 and 105 are connected to the input terminals 82A and 84A, respectively, of the X-axis coarse control mechanism 80A. At null, the signal output supplied by the light sensitive segments are equal and opposite and the voltages at the Y-axis coarse control 75A and the X-axis coarse control 80A are zero.

Figure 12:
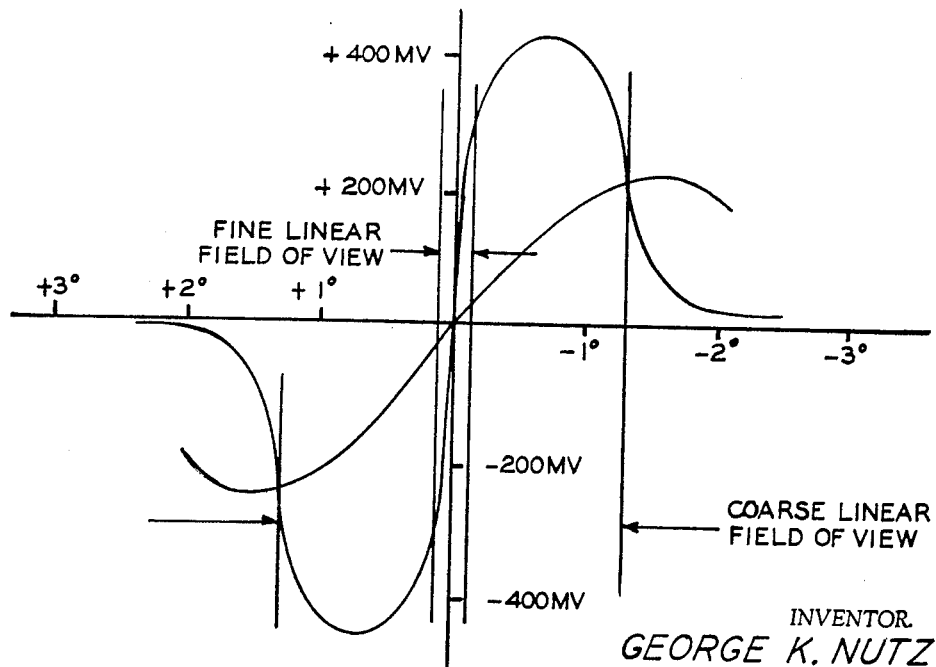
FIGURE 12 is a graphical illustration showing the control signal outputs of the fine and coarse angle light sensing cells of FIGURE 11.

The output from the segments 103 and 107 for controlling movement of the outer space vehicle about the Y-axis is shown graphically in FIGURE 12 and the output simulates a sine wave and is substantially linear in the indicated coarse linear field of view range. It will be observed that the amplitude of the output from the segments 103 and 107 varies with the azimuth position of the detector 100, when the zenith axis is not zero.

The output from the segments 101 and 105 for controlling movement of the vehicle about the X-axis is the same as the output from the segments 103 and 107 when the azimuth positions are displayed ninety degrees from the positions indicated.

It will be seen then that a fine and coarse two axis system may be provided on one optical piece of glass or pyramid prism 12, as shown in the modified form of FIGURES 7 through 11. In such a device, the quad cell arrangement 100 mounted on the rear flat surface 26 of the pyramid prism 12 along with masking 110 on the front flat surface 16 of the prism face provides a wide range of coarse signal information with arc minutes capability in both the X and Y axes, together with the fine angle signal information provided by the photovoltaic cells 38, 40, 42 and 44 with arc second nulling capability in both the X and Y axes, as heretofore explained, with reference to FIGURES 1 through 5.

Figure 7:
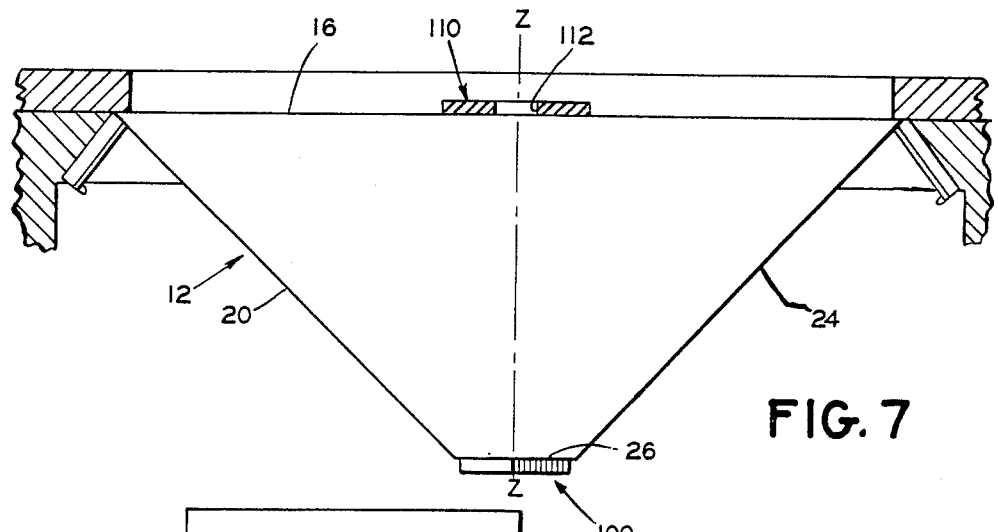
FIGURE 7 is an enlarged fragmentary sectional view of a modified form of the solid state pyramid prism sun sensor embodying the present invention and showing coarse angle sun sensing quad cells cemented to a back face surface of a frustum of the pyramid prism.
Figure 8:
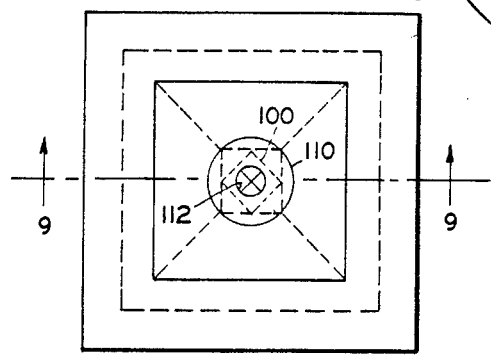
FIGURE 8 is a front view of the modified form of the sun sensor device including a housing and the prism in the form of a frustum of a pyramid and showing a suitable mask mounted on the flat front surface of the prism face to cause the quad cells on the rear surface of the prism to provide a wider range of coarse angle information in cooperation with the fine angle sensing photovoltaic cells cemented within the housing in a predetermined angular relation adjacent to the respective side surfaces of the pyramid prism.
Figure 9:
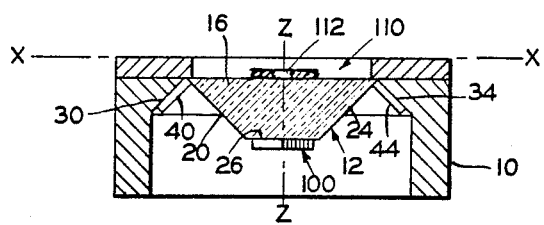
FIGURE 9 is a sectional view of FIGURE 8 taken along the lines 9—9 and looking in the direction of the arrows.
Figure 10:
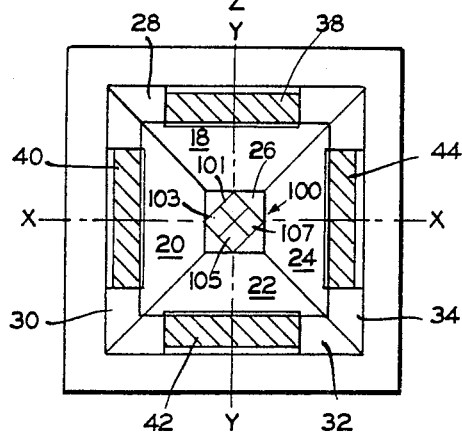
FIGURE 10 is a rear view of the sun sensor device of FIGURE 8 showing the fine angle sensing voltaic cells cemented within the housing in a predetermined angular relation adjacent to the respective side surfaces of the pyramid prism, together with the coarse angle light sensing cells suitably secured or cemented in a quad cell arrangement on the rear surface of the prism which is shown in the form of a frustum of a pyramid.

Furthermore, in the sun sensor of FIGURES 1 and 7, the pyramidal prism 12 having non-critical base angles serves to fold the path of the incoming sensed light rays so as to permit a maximum range in the location and size of the fine angle sensing cells 38, 40, 42 and 44 mounted interiorly of the sensor in an arrangement which eliminates two-axis tracking errors caused by thermal distortion.

While two embodiments of the invention have been illustrated and described, various changes in the form and relative arrangements of the parts, which will now appear to those skilled in the art, may be made without departing from the scope of the invention. Reference is, therefore, to be had to the appended claims for a definition of the limits of the invention.

What is claimed is:
1. A light sensing device of a type including a housing, a light ray sensing means having an area mounted internally within said housing, said housing having an opening therein, and media for conducting light rays passing through the opening from an exterior light source to the area of the light sensing means within the housing upon a misalignment of the light sensing device relative to the exterior light source; the improvement comprising said light conducting media including a pyramidal prism having a base mounted in said opening so as to provide a flat face surface of the prism upon which incoming light rays may impinge, the light sensing means including areas mounted at interior side surfaces of the housing on perpendicular axes in juxtaposition to side surfaces of the pyramidal prism, the pyramidal prism being effective to cause portions of the light rays impinging upon the prism face to be internally reflected within the pyramidal prism from the side surfaces thereof while upon a deviation of the light rays about either of said perpendicular axes said pyramidal prism effectively causes portions of the light rays to be refracted within the pyramidal prism to said areas of the light sensing means dependent upon and increasing directly with the misalignment of the light sensing device relative to the exterior light source to cause said areas of the light sensing means to provide electrical signals corresponding to deviations of the light sensing device relative to the exterior light source over a relatively small angular range.

2. The light sensing device defined by claim 1 in which each of the side surfaces of the prism form an angle with the base of the prism greater than an angle corresponding to a critical angle of the light conducting media of the prism at which the light rays within the pyramidal prism may pass from refraction to internal reflection within the prism.

3. The light sensing device defined by claim 1 in which the light sensing means includes a first pair of photovoltaic cells mounted at opposite interior side surfaces of the housing, a second pair of photovoltaic cells mounted at opposite interior side surfaces of the housing on an axis extending perpendicular to an axis of said first pair of photovoltaic cells, said first and second pair of photovoltaic cells being positioned in a predetermined angular relation and in a juxtaposition relative to the side surfaces of the pyramidal prism so that the photovoltaic cells provide electrical signals corresponding to deviations of the light sensing device relative to the exterior light source over the relatively small angular range.

4. The light sensing device defined by claim 3 in which each of the side surfaces of the pyramidal prism extend at an angle to the base of the prism greater than an angle corresponding to a critical angle of the light conducting media of the prism at which the light rays within the prism may pass from refraction to internal reflection within the prism, and the side surfaces of the pyramidal prism being so arranged that the light rays may be reflected upon internally impinging on a side surface at the critical angle so as to effect a folded path of the light rays within the prism while effecting a refraction of those light rays internally impinging upon said side surface at an angle less than the critical angle to thereupon cause the refracted light rays to be applied to the photovoltaic cell in said juxtaposition relative to said last mentioned side surface of the pyramidal prism to provide an electrical signal corresponding to a deviation of the light sensing device relative to the exterior light source over the relatively small angular range.

5. The light sensing device defined by claim 1 in which the prism has a form corresponding to a frustum of a pyramid so as to provide a flat rear surface, other light sensing means mounted on the flat rear surface of the prism, and masking means mounted on the face surface of the prism to cause the other light sensing means to provide electrical signals corresponding to deviations of the light sensing device relative to the exterior light source over a relatively large angular range.

6. The light sensing device defined by claim 4 in which the prism has a form corresponding to a frustum of a pyramid so as to provide a flat rear surface, other light sensing means mounted on the flat rear surface of the prism, and masking means mounted on the face surface of the prism to cause the other light sensing means to provide electrical signals corresponding to deviations of the light sensing device relative to the exterior light source over a relatively large angular range.

7. The light sensing device defined by claim 6 in which the masking means includes an opening therein permitting light rays of a relatively large angular range of deviation to be applied through the prism to said other light sensing means, and said other light sensing means including a quad cell arrangement of light sensing elements to provide electrical signals corresponding to deviations of the light rays relative to two perpendicular axes and over a relatively large angular range.

8. A sun sensor comprising a two-axis optical pyramid prism, light sensing cells positioned in a cooperative relation to side surfaces of the prism to provide two-axis electrical signal information corresponding to a fine angular relation of the sensor to the sun.

9. The sun sensor defined by claim 8 in which the prism includes a frustum of a pyramid having a flat rear surface, other light sensing cells mounted on the rear surface, light masking means mounted on a base surface face of the pyramid in cooperative relation with said other light sensing cells so as to permit light rays from the sun to pass through the prism to said other light sensing cells to cause said other light sensing cells to provide electrical signal information corresponding to a coarse angular relation of the sensor to the sun.

10. For use with a means for controlling attitude of a sun sensor device to effect a predetermined alignment of the device relative to the sun; the sun sensor device being of a type including a housing, a light ray detector means having an area mounted internally within said housing for operating said controlling means, and means for conducting light rays from the sun to the area of the detector means within the housing upon a misalignment of the device in relation to the sun; the improvement comprising said light conducting means including a pyramidal prism for internally reflecting substantially all of said light rays upon said predetermined alignment of the device in relation to the sun so as to thereupon divert the light rays of the sun from said light ray detector means, and said pyramidal prism being arranged to internally refract a portion of said light rays to the area of the detector means upon an angular misalignment of the device in relation to the sun about perpendicular axes so as to provide electrical signals corresponding to said angular misalignment.

11. The combination defined by claim 10 in which said pyramidal prism includes a frustum of a pyramid having a rear surface, other light ray detector means mounted on said rear surface, and light ray masking means mounted on a front base surface of the pyramidal prism to permit light rays within a limited angular misalignment range to pass through the pyramidal prism to said other light ray detector means so as to cause said other light ray detector means upon an angular misalignment of the device in relation to the sun over a substantially wide angular range about said perpendicular axes to provide electrical signals corresponding to said wide angular range of misalignment.

References Cited
UNITED STATES PATENTS

| | | | |
|---|---|---|---|
| 2,921,757 | 1/1960 | Houle | 250—203 X |
| 3,268,185 | 8/1966 | Eckermann | 250—203 X |
| 3,370,293 | 2/1968 | Green | 250—203 X |
| 3,414,213 | 12/1968 | Eckermann | 250—203 X |
| 3,423,593 | 1/1969 | Chinnock | 250—203 X |

JAMES W. LAWRENCE, Primary Examiner

C. R. CAMPBELL, Assistant Examiner

U.S. Cl. X.R.

250—83.3, 203, 208, 209, 212, 237